United States Patent
Shapiro

(10) Patent No.: US 7,470,884 B2
(45) Date of Patent: Dec. 30, 2008

(54) SIGNAL STRENGTH DETECTION CIRCUITS FOR HIGH SPEED OPTICAL ELECTRONICS

(75) Inventor: Phil Shapiro, Palo Alto, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/068,284

(22) Filed: Feb. 28, 2005

(65) Prior Publication Data

US 2005/0151063 A1    Jul. 14, 2005

Related U.S. Application Data

(62) Division of application No. 10/285,083, filed on Oct. 31, 2002, now Pat. No. 7,038,187.

(60) Provisional application No. 60/357,608, filed on Feb. 14, 2002.

(51) Int. Cl.
*H01J 40/14* (2006.01)
(52) U.S. Cl. .................................. 250/214 A
(58) Field of Classification Search ............. 250/214 R, 250/214 A, 210; 398/135; 330/255, 262
See application file for complete search history.

(56) References Cited

U.S. PATENT DOCUMENTS

| | | | |
|---|---|---|---|
| 5,237,526 A * | 8/1993 | Delagrange | 708/801 |
| 6,366,165 B1 * | 4/2002 | Huijsing et al. | 330/252 |
| 6,528,777 B2 * | 3/2003 | Ames et al. | 250/214 R |
| 6,855,920 B2 * | 2/2005 | Shapiro | 250/214 R |

OTHER PUBLICATIONS

U.S. Appl. No. 11/068,657, filed Feb. 28, 2005 entitled "Signal Strength Detection Circuits for High Speed Optical Electronics.".

* cited by examiner

*Primary Examiner*—Thanh X Luu
(74) *Attorney, Agent, or Firm*—Workman Nydegger

(57) ABSTRACT

This disclosure is generally concerned with devices for determining photocurrent levels. One example of such a device is an optoelectronic transceiver that includes a laser and a photodetector. The photodetector is configured to receive an optical signal and generate a corresponding electrical signal. The electrical signal is received by a first stage circuit which then converts the received electrical signal to a differential output. Finally, a second stage circuit in communication with the first stage circuit is configured to derive an optical signal strength of the optical signal based upon the differential output received from the first stage circuit.

8 Claims, 5 Drawing Sheets

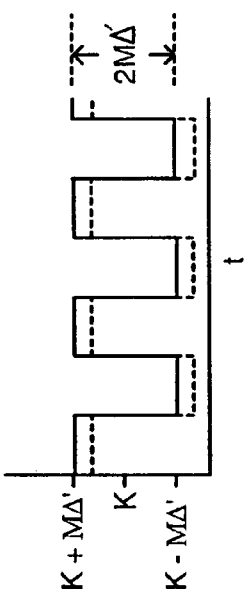

SIGNAL STRENGTH DETECTION CIRCUITS FOR HIGH SPEED OPTICAL ELECTRONICS

CROSS-REFERENCE TO RELATED APPLICATIONS

This application is a divisional, and claims the benefit, of U.S. patent application Ser. No. 10/285,083, entitled SIGNAL STRENGTH DETECTION IN HIGH SPEED OPTICAL ELECTRONICS, filed Oct. 31, 2002, now U.S. Pat. No. 7,038,187 which, in turn, claims the benefit U.S. Provisional Patent Application No. 60/357,608, filed Feb. 14, 2002. All of the foregoing patent applications are incorporated herein in their respective entireties by this reference.

TECHNICAL FIELD

Embodiments of the present invention relate generally to signal detectors, and particularly to optical signal strength detection circuits and associated devices.

BACKGROUND OF THE INVENTION

It is useful to measure the received optical power in fiber optic links in order to determine the integrity of the signal path and terminal devices. The photo-current in the photo-diode is proportional to the received power. Hence, one way of measuring received optical power is to measure the photo-current level.

Typical optoelectronic receivers utilize a photo-detector which is integrated in the same TO (Transistor Outline) package as the pre-amplifier. Most TO packages have only four pins. Two of the pins are connected to receive a differential signal from the pre-amplifier, one of the pins receives a power supply voltage, and one of the pins is for ground. Since all four pins of the TO packages each have a defined function, there is no separate lead available to output the photo-current. A fifth pin would not be an ideal solution because space is at a premium in TO packages.

Several prior art signal detectors measure the photo-current level without the use of a fifth pin. At low signal amplitudes (e.g., at 0.5 mV or less), however, these signal detectors exhibit a significant loss of gain—and thus accuracy. This loss of gain at low signal amplitudes is caused by a breakdown of the switch-like behavior of these signal detectors.

SUMMARY OF EMBODIMENTS OF THE INVENTION

The present invention provides a more accurate method and apparatus for measuring the photo-current of a photo-diode in a fiber optic receiver or transceiver. In particular, the photo-current level is derived from the differential output of a pre-amplifier circuit.

An aspect of the present invention includes a voltage difference detector circuit that comprises first, second, third, fourth, fifth, and sixth circuit elements. The first circuit element is configured to receive a first voltage of a differential voltage pair. The second circuit element is configured to receive a second voltage of the differential voltage pair. The third circuit element connects the first circuit element to the second circuit element and is configured such that a first current proportional to a difference between the first voltage and the second voltage passes through the third circuit element. The fourth circuit element is coupled to the first circuit element and to the fifth circuit element and is configured to be affected by the first current such that a second current substantially equal in amplitude to the first current passes through the fourth circuit element to the fifth circuit element when the second voltage is greater than the first voltage. The sixth circuit element is coupled to the second circuit element and to the fifth circuit element and is configured to be affected by the first current such that a third current substantially equal in amplitude to the first current passes through said sixth circuit element to the fifth circuit element when the first voltage is greater than the second voltage. As a result, the difference between the first voltage and the second voltage may be determined by reference to the second current and the third current that flow to the fifth circuit element.

Another aspect of the present invention also includes a voltage difference detector circuit that comprises a voltage-to-current converter, a first current regulator, a second current regulator, and a current-to-voltage converter. The voltage-to-current converter is configured to 1) receive a first voltage and a second voltage of a differential voltage pair, 2) convert a difference between the first voltage and the second voltage to a first current, 3) draw a second current from the first current regulator substantially equal to a current offset plus the first current, and 4) draw a third current from the second current regulator substantially equal to a current offset minus the first current. The first current regulator is configured to produce at least a first amount of current and to produce a fourth current that flows to the current-to-voltage converter when the first amount of current is greater than the second current—the fourth current is substantially equal to a difference between said second current and said first amount of current. The second current regulator is configured to produce at least a second amount of current and to produce a fifth current that flows to the current-to-voltage converter when the second amount of current is greater than the third current—the fifth current is substantially equal to a difference between the third current and the second amount of current. The current-to-voltage converter is configured to convert the fourth current to a third voltage and to convert the fifth current to a fourth voltage. The third voltage and the fourth voltage are proportional to a difference between the first voltage and the second voltage.

Still another aspect of the present invention also includes a signal detector circuit that comprises a first portion, a second portion, a first resistor, and a second resistor. The first portion is coupled to receive a first signal. The second portion is coupled to receive a second signal that is complementary to the first signal. The first resistor is coupled to the first portion and the second portion. The second resistor is coupled to the first portion and the second portion. A current generated in response to a difference between the first signal and the second signal and flowing across the first resistor causes a corresponding current to flow across the second resistor to produce a potential difference that is representative of said difference between the first and second signals.

Yet another aspect of the present invention also includes a signal detector circuit. The signal detector circuit includes a first left transistor with a first emitter terminal coupled to a first resistor and a first left constant current source, a first collector terminal coupled to a left current drain, a second left constant current source, and a third left current source, and a first base terminal that receives a first signal, which fluctuates between a maximum voltage and a minimum voltage. The signal detector circuit also includes a first right transistor with a second emitter terminal coupled to the first resistor and a first right constant current source, a second collector terminal coupled to a right current drain, a second right constant current source, and a third right current source, and a second base terminal that receives a second signal that is complementary to the first signal. The signal detector circuit further includes a second resistor coupled to the left current drain and the right current drain. A current generated in response to a difference between the first signal and the second signal and flowing across the first resistor causes a corresponding current to flow across the second resistor to produce a potential difference that is representative of a difference between the first signal and the second signal.

BRIEF DESCRIPTION OF THE DRAWINGS

Aspects of embodiments of the present invention will be more readily apparent from the following description and appended claims when taken in conjunction with the accompanying drawings, in which:

FIG. 2B is a graph of the voltage at points $A_L$ and $B_L$ of the signal detector circuit of FIG. 2A;

FIG. 2C is a graph of the voltage at points $A_R$ and $B_R$ of the signal detector circuit of FIG. 2A;

FIG. 2D is a graph of the voltage across a first resistor of the signal detector circuit of FIG. 2A; circuit of FIG. 2A;

FIG. 2G is a graph of the voltage across the second resistor of the signal detector circuit of FIG. 2F.

DESCRIPTION OF EXEMPLARY EMBODIMENTS

Exemplary embodiments of the invention are described below. In the interest of clarity, not all features of an actual implementation are described. It will be appreciated that in the development of any such embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1A:
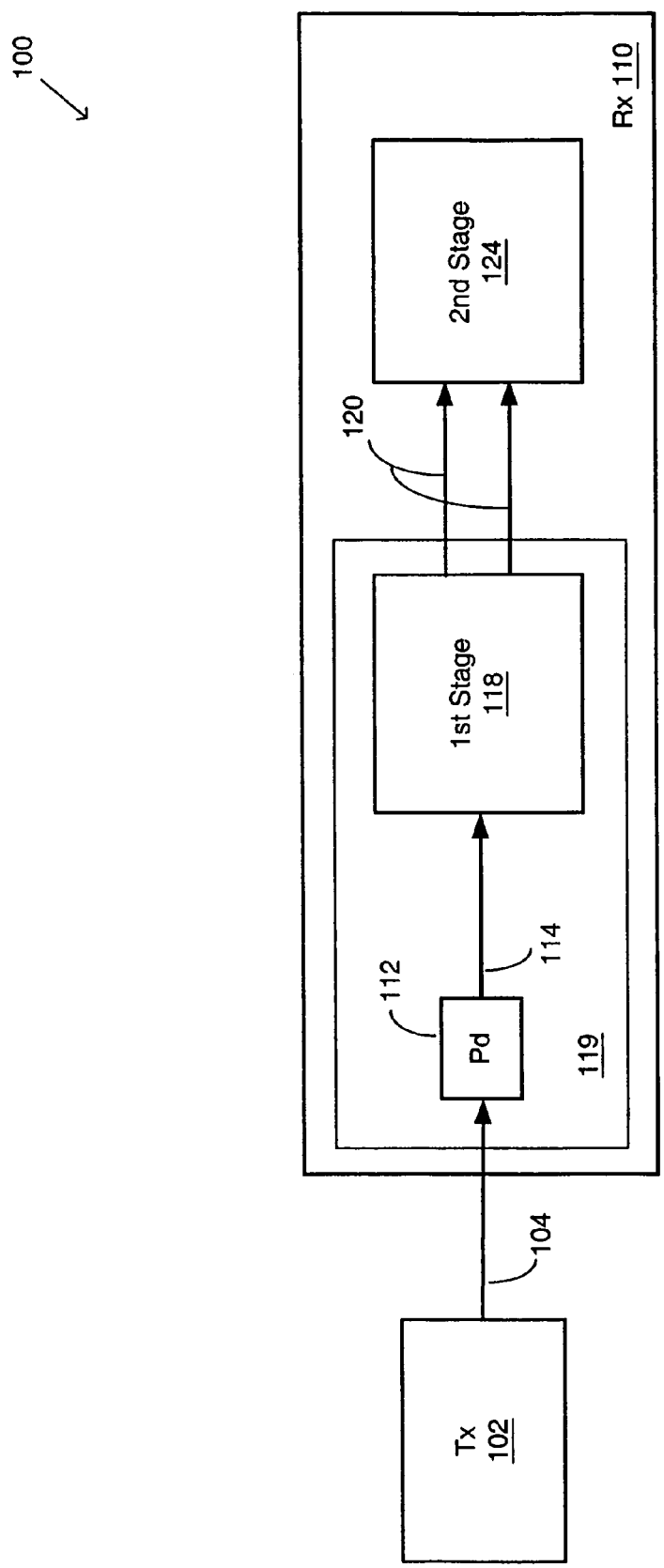
FIG. 1A is a block diagram of an optical communication system according to an embodiment of the present invention.
Figure 1B:
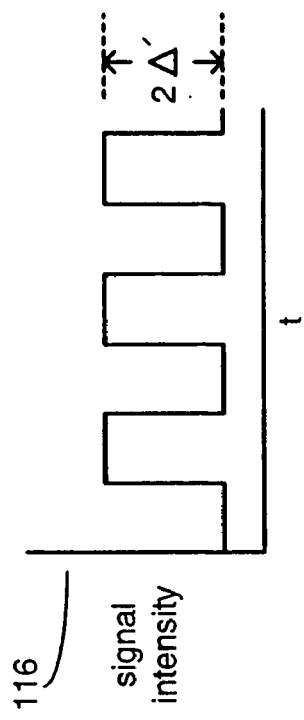
FIG. 1B is a graph of the light intensity of an exemplary light signal sent by the transmitter over a period of time.

FIG. 1A shows a block diagram of an optical communication system 100 according to one embodiment of the present invention. The communication system 100 includes an optoelectronic transmitter/transceiver 102 that transmits a light signal 104 with an associated frequency and light intensity. The transmitter 102 typically includes a laser and optics (not illustrated) to transmit the light signal 104. A light intensity graph 106 included in FIG. 1B shows the light intensity of an exemplary light signal 104 sent by the transmitter 102 over a period of time. The light intensity corresponds to the voltage of the light signal 104. The peak-to-peak amplitude or signal strength of the light signal 104 is denoted on the light intensity graph 106 by the symbol 2Δ.

The communication system 100 also includes an optoelectronic receiver/transceiver 110 that receives the light signal 104 from the transmitter 102.

The receiver 110 contains a photo-diode 112, a first stage circuit 118 (e.g., a Pre-Amplifier Circuit), and a second stage circuit 124 (e.g., a Post-Amplifier Circuit). In an exemplary implementation, the photo-diode 112 and the first stage circuit 118 are integrated into a Transistor Outline (TO) package 119, which is typically part of the optoelectronic receiver/transceiver 110.

Figure 1C:
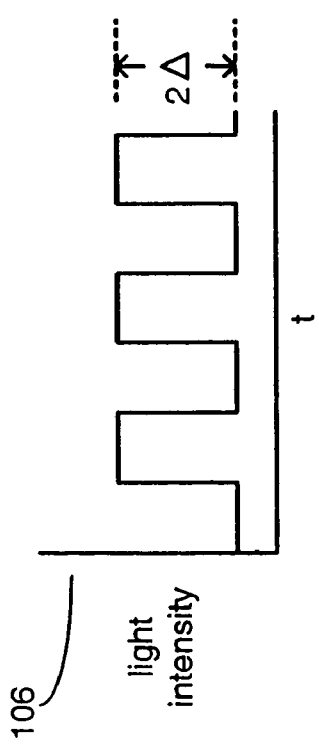
FIG. 1C is a graph of the signal strength of an exemplary electrical signal produced by a photo-diode over a period of time.

The photo-diode 112 receives the light signal 104 from the transmitter 102 and converts it to an electrical signal 114. The electrical signal 114 has an associated signal strength corresponding to the voltage of the electrical signal 114. A signal intensity graph 116 included in FIG. 1C shows the signal strength of an exemplary electrical signal 114 produced by the photo-diode 112 over a period of time. The peak-to-peak amplitude or signal strength of the electrical signal 114 is denoted on the signal intensity graph 116 as 2Δ.' The signal strength 2Δ' of the electrical signal 114 is proportional to the signal strength 2Δ of the light signal 104. This proportionality is a function of the photo diode's 112 scaling or loss factors.

Figure 1D:
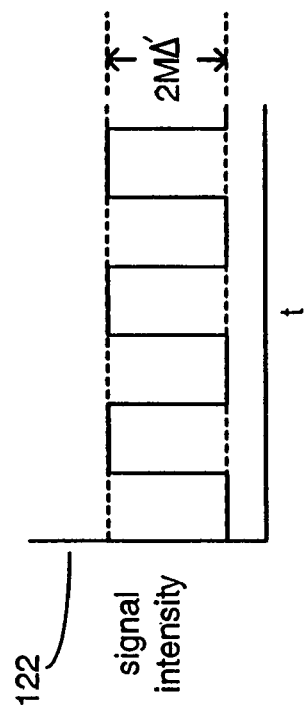
FIG. 1D is a graph of the signal strength of exemplary differential signals produced by a first stage circuit over a period of time.

The first stage circuit 118 receives the electrical signal 114 from the photodiode 112 and produces amplified differential signals 120. The amplified differential signals 120 consist of a positive pre-amplifier output and a negative preamplifier output. The amplified differential signals 120 have a signal strength that corresponds to the voltage thereof. A signal intensity graph 122 included in FIG. 1D shows the signal strength of exemplary differential signals 120 produced by the first stage circuit 118 over a period of time. In FIG. 1D, the positive pre-amplifier output corresponds to the dashed line and the negative pre-amplifier output corresponds to the solid line. As shown by the signal intensity graph 122, the voltage of the positive pre-amplifier output is at a maximum (e.g., at MΔ') when the voltage of the negative pre-amplifier output is at a minimum (e.g., at −MΔ') and vice versa. In other words, the amplified differential signals 120 are nominally equal in amplitude, but 180 degrees out of phase.

The peak-to-peak amplitude or signal strength of the differential signals 120 is represented on the signal intensity graph 122 as 2MΔ', where M corresponds to the amplification factor of the first stage circuit 118. The signal strength 2Δ of the light signal 104 may be derived from the signal strength 2MΔ' of the differential signals 120 by first determining the signal strength 2Δ' of the electrical signal 114 using the amplification factor M of the first stage circuit 118 and then determining the signal strength 2Δ of the light signal 104 using the scaling or loss factors of the photo diode 112.

The second stage circuit 124 receives the differential signals 120 from the first stage circuit 118 for further processing. The present invention provides particular circuit designs for use as part of the second stage circuit 124 to determine the signal strength 2MΔ' of the differential signals 120.

Signal Detector Circuit

Figure 2A:
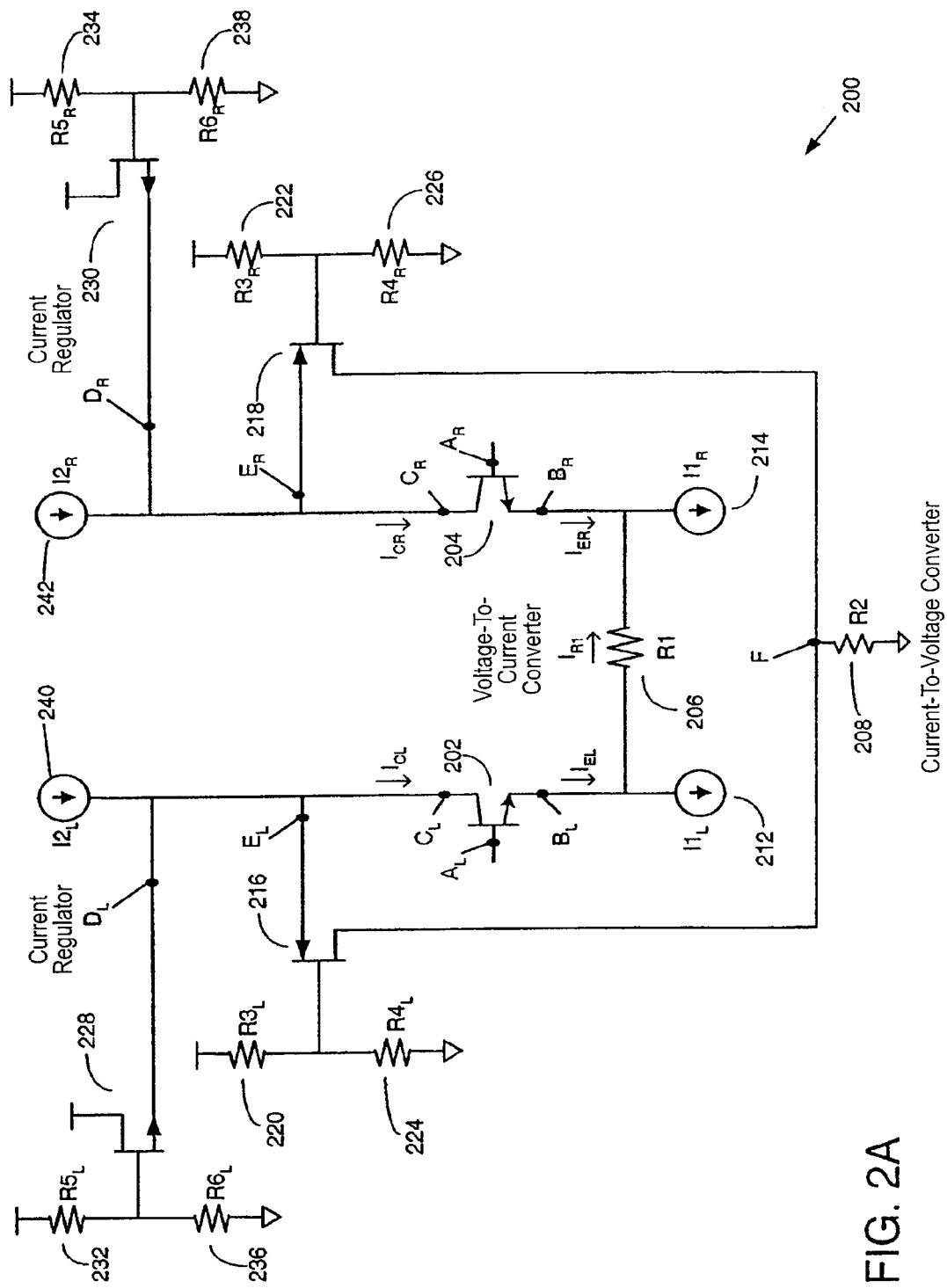
FIG. 2A is a diagram of a signal detector circuit in accordance with the present invention.

FIG. 2A shows a general circuit layout for a signal detector circuit 200 for use in or as the second stage circuit 124 of FIG. 1A in accordance with an embodiment of the present invention. As shown in FIG. 2A, the signal detector circuit 200 includes a first resistor 206 with a resistance value of R1, a second resistor 208 with a resistance value of R2, a first left transistor 202 (i.e., a first transistor positioned to the left of the first resistor 206 in FIG. 2A), a first right transistor 204 (i.e., a first transistor positioned to the right of the first resistor 206 in FIG. 2A), a first left current source 212 producing a current $I1_L$, a first right current source 214 producing a current $I1_R$, a second left transistor 216, a second right transistor 218, a third left resistor 220 with a resistance value of $R3_L$, a third right resistor 222 with a resistance value of $R3_R$, a fourth left resistor 224 with a resistance value of $R4_L$, a fourth right resistor 226 with a resistance value of $R4_R$, a third left transistor 228, a third right transistor 230, a fifth left resistor 232 with a resistance value of $R5_L$, a fifth right resistor 234 with a resistance value of $R5_R$, a sixth left resistor 236 with a resistance value of $R6_L$, a sixth right resistor 238 with a resistance value of $R6_R$, a second left current source 240 producing a current $I2_L$, and a second right current source 242 producing a current $I2_R$.

On the left side of the signal detector circuit 200, the emitter terminal of the first left transistor 202 is coupled to the first resistor 206 and the first left current source 212. The collector terminal of the first left transistor 202 is coupled to the source terminal of the second left transistor 216, the source terminal of the third left transistor 228, and the second left current source 240. The base terminal of the first left transistor 202 is coupled to the first stage circuit 118 (FIG. 1A) and receives a first of the differential signals 120 produced by the first stage circuit 118.

The gate terminal of the second left transistor 216 is coupled to the third and fourth left resistors 220, 224. The third left resistor 220 is also coupled to a power source and the fourth left resistor 224 is also coupled to circuit ground. The drain terminal of the second left transistor 216 is coupled to the second resistor 208 and the drain terminal of the second right transistor 218. The second resistor 208 is also coupled to circuit ground.

The gate terminal of the third left transistor 228 is coupled to the fifth and sixth left resistors 232, 236. The fifth left resistor 232 is also coupled to a power source and the sixth left resistor 236 is also coupled to circuit ground. The drain terminal of the third left transistor 228 is coupled to a power source. The source terminal of the third left transistor 228 is coupled to the source terminal of the second left transistor 216 and coupled to the second left current source 240.

On the right side of the signal detector circuit 200, the emitter terminal of the first right transistor 204 is coupled to the first resistor 206 and the first right current source 214. The collector terminal of the first right transistor 204 is coupled to the source terminal of the second right transistor 218, the source terminal of the third right transistor 230, and the second right current source 242. The base terminal of the first right transistor 204 is coupled to the first stage circuit 118 (FIG. 1A) and receives a second of the differential signals 120 produced by the first stage circuit 118.

The gate terminal of the second right transistor 218 is coupled to the third and fourth right resistors 222, 226. The third right resistor 222 is also coupled to a power source and the fourth right resistor 226 is also coupled to circuit ground. The drain terminal of the second right transistor 218 is coupled to the second resistor 208 and the drain terminal of the second left transistor 216.

The gate terminal of the third right transistor 230 is coupled to the fifth and sixth right resistors 234, 238. The fifth right resistor 234 is also coupled to a power source and the sixth right resistor 238 is also coupled to circuit ground. The drain terminal of the third right transistor 230 is coupled to a power source. The source terminal of the third right transistor 230 is coupled to the source terminal of the second right transistor 218 and coupled to the second right current source 242.

Preferably, the first left transistor 202 and first right transistor 204 are bipolar junction transistors (BJTs) and the second left transistor 216, second right transistor 218, third left transistor 228, and third right transistor 230 are field effect transistors (FETs). The use of these transistors, however, should not be read as a limitation of the invention as other transistor types or combinations may be used without departing from the scope of the present invention.

With respect to the current $I_{EL}$, which is the current flowing out of the emitter of the first left transistor 202, it is actually equal to the current $I_{CL}$, which is the current flowing into the collector of the first left transistor 202, plus the current flowing into the base terminal of the first left transistor 202. But in preferred embodiments of the present invention, the current $I_{EL}$ is substantially equal to the current $I_{CL}$ because the current $I_{CL}$ is much greater than the current flowing into the base terminal of the first left transistor 202. Similarly, the current $I_{ER}$, which is the current flowing out of the emitter of the first right transistor 204, is substantially equal to the current $I_{CR}$, which is the current flowing into the collector of the first left transistor 204, because the current $I_{CR}$ is much greater than the current flowing into the base terminal of the first right transistor 204. So for purposes of describing the present invention, the currents $I_{EL}$ and $I_{CL}$ and the currents $I_{ER}$ and $I_{CRL}$, respectively, are assumed to be identical. And the values of the currents $I1_L$, $I1_R$, $I2_L$, and $I2_R$ produced by the first left current source 212, the first right current source 214, the second left current source 240, and the second right current source 242, respectively, are all approximately equal.

Further, the signal detector circuit 200 is preferably configured such that the power sources, resistors, and circuit ground connected directly or indirectly to the gate terminals of the second and third left transistors 216, 228 and the second and third right transistors 218, 230, respectively, turn these transistors on and off (e.g., enable the flow of current through the source and drain terminals of these transistors) instead of controlling the flow of current through the source and drain terminals of these transistors so that it corresponds to the voltage at the respective gate terminals of these transistors. So significant current flows through the source and drain terminals of these transistors only when "pulled" or "pushed" by other aspects of the signal detector circuit 200.

The arrows on the source terminals of the second and third left transistors 216, 228 and the second and right transistors 218, 230 indicate the only direction in which current may flow through these terminals. So if the amplitude of the current $I_{CL}$ is less than the amplitude of the current $I2_L$, which is produced by the second left current source 240, current flows into and out of the source and drain terminals, respectively, of the second left transistor 216. Conversely, if the amplitude of the current $I_{CL}$ is greater than the amplitude of the current $I2_L$, current flows from the source terminal of the third left transistor 228.

Similarly, if the amplitude of the current $I_{CR}$ is less than the amplitude of the current $I2_R$, which is produced by the second right current source 242, current flows into and out of the source and drain terminals, respectively, of the second right transistor 218. Conversely, if the amplitude of the current $I_{CR}$ is greater than the amplitude of the current $I2_R$, current flows from the source terminal of the third right transistor 230.

Additionally, the voltage drop across the respective collector and emitter terminals of the first left and right transistors 202, 204 is preferably greater than or equal to 0.5 volts. This ensures that the first left and right transistors 202, 204 are turned on. A voltage drop greater than or equal to 0.5 volts is preferably accomplished with standard transistor biasing techniques known in the art.

Persons skilled in the art recognize that when in the active region, the current that flows through the collector and emitter terminals of a transistor is limited by the current received at the base terminal of these transistors and/or the voltage drop across the base terminal and the emitter terminal of these transistors. In other words, such inputs to a transistor may enable a certain amount of current to flow through a transistor, but this amount of current only flows if connected circuitry makes this current available. In embodiments of the present invention, the amplitude of the current produced by the constant current sources 212, 214, 240, 242 and the resistive value of the first resistor 206 are preferably selected so that the current that flows through the collector and emitter terminals of the first left and right transistors 202, 204 is only a function of the voltage drop across the first resistor 206 and not the gain of these transistors.

Operation of the Signal Detector Circuit

In the course of the operation of the signal detector circuit 200, the base terminal of the first left transistor 202 receives one of the differential signals 120 produced by the first stage circuit 118 and the base terminal of the first right transistor 204 receives the other differential signal 120 produced by the first stage circuit 118. Again, the voltages received at the base terminals of the first left transistor 202 and the first right transistor 204, respectively, are nominally equal in amplitude, but 180 degrees out of phase. So if the differential signal 120 received at the base terminal of the first left transistor 202 (i.e., at point $A_L$) has a voltage of K+MΔ', the differential signal 120 at the base terminal of the first right transistor 204 (i.e., at point $A_R$) has a voltage of K−MΔ' and vice versa. K is preferably a DC voltage offset sufficiently high enough to at least ensure that the first left transistor 202 and the first right transistor 204 are turned on regardless of the value of the differential signals 120. More specifically, the offset voltage across the base and emitter of a typical transistor (e.g., the first left transistor 202 and the first right transistor 204) is usually 0.6 or 0.7 volts. Persons skilled in the art recognize that the voltage at the base of a typical transmitter (e.g., K+MΔ' to K−MΔ') must be greater than the offset voltage in order for the transistor to be turned on. Numerous circuits (not illustrated) known in the art may be used to add the DC offset voltage K to the differential signals 120 produced by the first stage circuit 118 without departing from the scope of the present invention.

The voltage at point $A_L$ over time is shown in FIG. 2B as a solid line. As shown in FIG. 2B, the differential signal 120 received at point $A_L$ has a peak-to-peak amplitude of 2MΔ' and fluctuates between a maximum voltage of K+MΔ' and a minimum voltage of K−MΔ'. The voltage at point $A_R$ over time is shown in FIG. 2C as a solid line. As shown in FIG. 2C, the differential signal 120 received at point $A_R$ also has a peak-to-peak amplitude of 2MΔ' and fluctuates between a maximum voltage of K+MΔ' and a minimum voltage of K−MΔ'.

When the voltage at point $A_L$ is equal to K+MΔ', the voltage at the emitter terminal of the first left transistor 202 (i.e., at point $B_L$) is equal to (K+MΔ'−0.7V), 0.7V being a typical offset voltage across the base and emitter of a transistor. Similarly, when the voltage at point $A_R$ is equal to K+MΔ', the voltage at the emitter terminal of the first right transistor 204 (i.e., at point $B_R$) is equal to (K−MΔ'−0.7V). The voltage at points $B_L$ and $B_R$ are shown in FIGS. 2B and 2C, respectively, as dashed lines. As shown in FIG. 2B, the peak-to-peak voltage at point $B_L$ over time is the same as the voltage at point $A_L$ but offset by 0.7V. Similarly, the peak-to-peak voltage at $B_R$ over time is the same as the voltage at $A_R$ but offset by 0.7V.

When the voltage at point $B_L$ is equal to (K+MΔ'−0.7V) and the voltage at point $B_R$ is equal to (K−MΔ'−0.7V), the voltage $V_{R1}$ across the first resistor 206 is equal to (K+MΔ'−0.7V)−(K−MΔ'−0.7V), which is equal to 2MΔ'. When the voltage at point $B_L$ is equal to (K−MΔ'−0.7V) and the voltage at point $B_R$ is equal to (K+MΔ'−0.7V), the voltage $V_{R1}$ across the first resistor 206 is equal to (K−MΔ'−0.7V)−(K+MΔ'−0.7V), which is equal to −2MΔ'. The voltage $V_{R1}$ over time is shown in FIG. 2D and varies from a maximum voltage of 2MΔ' to a minimum voltage of −2MΔ'. The current $I_{R1}$ flowing through the first resistor 206, therefore, is equal to ($V_{R1/R1}$) and varies from (2MΔ'/R1) to (−2MΔ'/R1) over time.

The value of the current $I_{EL}$ flowing out of the emitter terminal of the first left transistor 202 is equal to the current $I1_L$ produced by the first left current source 212 plus the current $I_{R1}$ flowing through the first resistor 206. Therefore, when the voltage at point $A_L$ is at a maximum voltage of K+MΔ', the current $I_{EL}$ is equal to ($I1_L$+2MΔ'/R1). And when the voltage at point $A_L$ is at a minimum voltage of K−MΔ', the current $I_{EL}$ is equal to ($I1_L$+(−2MΔ'/R1)).

So when the voltage at point $A_L$ is at a maximum voltage of K+MΔ', current $I_{CL}$, which is assumed to be equal to the current $I_{EL}$, is ($I1_L$+2MΔ'/R1). If the current $I2_L$ produced by the second left current source 240 is equal to $I1_L$, a current equal to (2MΔ'/R1) is pulled from the third left transistor 228 and no significant amount of current flows into the second left transistor 216.

And when the voltage at point $A_L$ is at a minimum voltage of K−MΔ', current $I_{CL}$ is ($I1_L$+(−2MΔ'/R1)). If the current $I2_L$ produced by the second left current source 240 is equal to $I1_L$, a current equal to (2MΔ'/R1) is pushed through the second left transistor 216 and no significant amount of current flows through the third left transistor 228.

In other words, when the current flowing through the first left transistor 202 is less than the current produced by the second left current source 240, the excess amount of the current produced by the second left current source 240 flows through the second left transistor 216. And when the current flowing through the first left transistor 202 is greater than the current produced by the second left current source 240, the shortfall of current flows through the third left transistor 228 and combines with the current produced by the second left current source 240.

As noted above, current only flows through the transistors illustrated in FIG. 2A in the direction of the corresponding arrows. So when current flows (i.e., is pushed) through the second left transistor 216, all of this current flows through the second resistor 208—none of this current flows through the second right transistor 218. The voltage drop across the second resistor 208 when the voltage at point $A_R$ is at a minimum voltage of K−MΔ', therefore, is equal to (2MΔ'/R1)*R2.

The first and second left current sources 212, 240, therefore, are preferably configured to ensure that 1) a positive current always flows through the first left transistor 202, a requirement for the first left transistor 202 to remain on and 2) a current proportional to the differential signals 120 flows through the second left transistor 216 when the current $I2_L$ exceeds the current $I_{CL}$. To do so, these current sources preferably each produce a current greater than (2MΔ'/R1).

The value of the current $I_{ER}$ flowing out of the emitter terminal of the first right transistor 204 is equal to the current $I1_R$ produced by the first right current source 214 minus the current $I_{R1}$ flowing through the first resistor 206. Therefore, when the voltage at point $A_R$ is at a minimum voltage of K−MΔ', the current $I_{ER}$ is equal to ($I1_R$+(−2MΔ'/R1)). And when the voltage at point $A_R$ is at a maximum voltage of K+MΔ', the current $I_{ER}$ is equal to ($I1_R$+2MΔ'/R1)).

So when the voltage at point $A_R$ is at a minimum voltage of K−MΔ', current $I_{CR}$, which is assumed to be equal to the current $I_{ER}$, is ($I1_R$+(−2MΔ'/R1)). If the current $I2_R$ produced by the second right current source 242 is equal to $I1_R$, a current equal to (−2MΔ'/R1) is pushed through the second right transistor 218 and no significant amount of current flows through the third right transistor 230.

And when the voltage at point $A_R$ is at a maximum voltage of K+MΔ', current $I_{CR}$ is (I1$_R$+2MΔ'/R1). If the current I2$_R$ produced by the second right current source 242 is equal to I1$_R$, a current equal to (2MΔ'/R1) is pulled from the third right transistor 230 and no significant amount of current flows into the second right transistor 218.

In other words, when the current flowing through the first right transistor 204 is greater than the current produced by the second right current source 242, the shortfall of current flows through the third right transistor 230 and combines with the current produced by the second right current source 242. And when the current flowing through the first right transistor 204 is less than the current produced by the second right current source 242, the excess amount of the current produced by the second right current source 242 flows through the second right transistor 218.

When current flows (i.e., is pushed) through the second right transistor 218, all of this current flows through the second resistor 208—none of this current flows through the second left transistor 216. The voltage drop across the second resistor 208 when the voltage at point $A_R$ is at a minimum voltage of K−MΔ', therefore, is equal to (2MΔ'/R1)*R2.

The first and second right current sources 214, 242, therefore, are preferably configured to ensure that 1) a positive current always flows through the first right transistor 204, a requirement for the first right transistor 204 to remain on and 2) a current proportional to the differential signals 120 flows through the second right transistor 218 when the current I2$_R$ exceeds the current $I_{CR}$. To do so, these current sources preferably each produce a current greater than (2MΔ'/R1).

So regardless of which differential signal is at a minimum voltage of K−MΔ', the voltage across the second resistor 208 (i.e., the voltage $V_{R2}$) is equal to (2MΔ'/R1)*R2. The ideal output of the signal detector circuit 200 or the voltage drop, $V_{R2}$, across the second resistor 208 is illustrated in FIG. 2E.

Since the values of R1 and R2 are known, the signal strength 2MΔ' of the differential signals 120 can be determined from the voltage $V_{R2}$ across the second resistor 208. As stated above, the signal strength 2Δ of the light signal 104 may be derived from the signal strength 2MΔ' of the differential signals 120 by first determining the signal strength 2Δ' of the electrical signal 114 using the amplification factor M of the first stage circuit 118 and then determining the signal strength 2Δ of the light signal 104 using the scaling or loss factors of the photo diode 112.

Figure 2F:
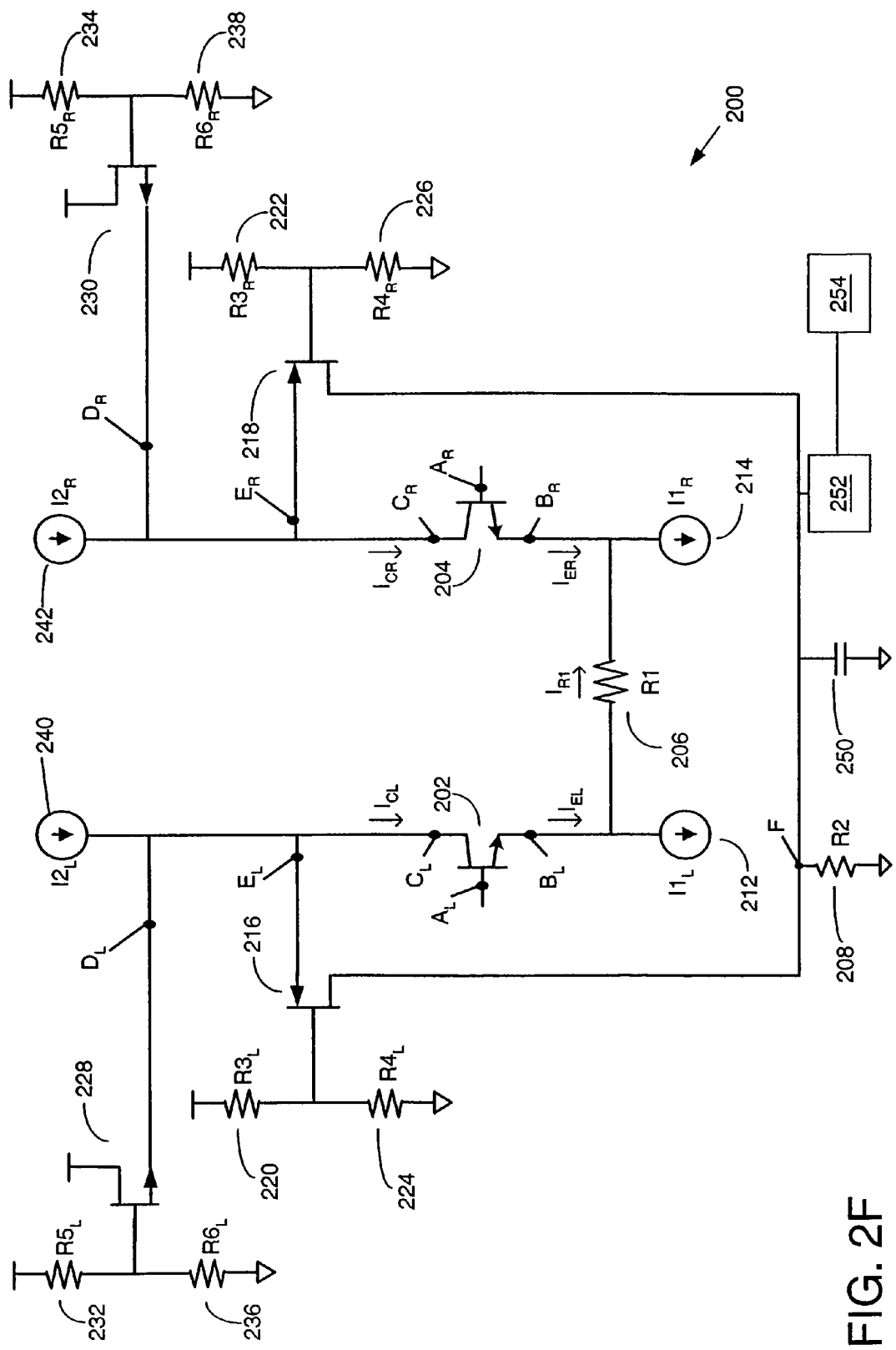
FIG. 2F is a diagram of another signal detector circuit in accordance with the present invention.

In some embodiments, the voltage drop across the second resistor 208 is input to, for example, an A/D converter 252—as illustrated in FIG. 2F. The output of the A/D converter may then be read by a microprocessor 254 or other device. The result can thus be read by an external system via a standard transceiver interface. As stated above, output of the signal detector circuit 200 illustrated in FIG. 2E is an idealized output. In actuality, the voltage wave forms illustrated in FIGS. 2B-2D are not perfect square waves. Instead, a certain amount of time is required for the voltages to swing from a maximum amplitude to a minimum amplitude and vice versa. As a result, there will be periods of time in which neither of the voltages at the base terminals of the first left transistor 202 and the first right transistor 204, respectively, are equal to the minimum voltage of K−MΔ'. During these periods of time, one of these voltage is between 0 and K−MΔ' and the other is between 0 and K+MΔ'. So the current that flows through the second resistor 208, for these periods of time, varies between (2MΔ'/R1) to (−2MΔ'/R1). An exemplary, actual voltage drop, VΔR2, across the second resistor 208 is illustrated in FIG. 2G (this too is a somewhat idealized illustration as the actual voltage wave form is not likely entirely linear). As a result, a capacitor 250 may be included in some embodiments of the present invention in parallel with the second resistor 208, as also illustrated in FIG. 2F, in order to smooth out the wave form illustrated in FIG. 2G. In still other embodiments, the period of the differential signals is known so that the voltage $V_{R2}$ is sampled only during periods of stability, which correspond to when the voltages at the base terminals of one or the other of the first left transistor 202 and the first right transistor 204 is equal to the minimum voltage of K−MΔ'.

But even with the slight errors described in the previous paragraph, the present invention represents an improvement over prior art signal detector circuits. This is due in part to the fact that the present invention does not rely upon the gain of the transistors included therein. Instead, the transistors are merely turned on to enable the flow of current. And the current across the second resistor 208 results from current across the first resistor 206, which is a function of the relative values of the differential signals 120, and the fact that current flows through transistors in only one direction regardless of temperature or method of manufacture. And any offset voltage variations of the transistors illustrated in FIG. 2A or FIG. 2F due to temperature are largely offset by equal changes in corresponding transistors (e.g., a change in the offset voltage of the first left transistor 202 is largely offset by an equal change in the offset voltage of the first right transistor 204).

While the present invention has been described with reference to a few specific embodiments, the description is illustrative of the invention and is not to be construed as limiting the invention. Various modifications may occur to those skilled in the art having the benefit of this disclosure without departing from the inventive concepts described herein.

What is claimed is:

1. An optoelectronic transceiver, comprising:
    a laser;
    a photodetector configured to receive an optical signal and generate a corresponding electrical signal;
    a first stage circuit integrated into a TO package with the photodetector, the first stage circuit being configured to receive the electrical signal generated by the photodetector and to convert the received electrical signal to a differential output; and
    a second stage circuit in communication with the first stage circuit and configured to derive an optical signal strength of the optical signal based upon a signal strength 2MΔ' of the differential output of the first stage circuit, where "M" is an amplification factor associated with the first stage circuit, and "2Δ'" is a signal strength of the differential output from the photodetector, wherein the second stage circuit derives the optical signal strength using a combination of bipolar junction transistors and field effect transistors, the second stage circuit comprising:
        a voltage-to-current converter;
        a first current regulator;
        a second current regulator; and
        a current-to-voltage converter, where the voltage-to-current converter, first current regulator, second current regulator, and current-to-voltage converter, respectively, are configured and arranged to operate as follows:
        the voltage-to-current converter is configured to:
            receive first and second voltages from the differential output of the first stage circuit;
            convert a difference between the first and second voltages to a first current;

draw a second current from the first current regulator substantially equal to a sum of a first current offset and the first current; and draw a third current from the second current regulator substantially equal to a difference between a second current offset and the first current; the first current regulator is configured to:

produce at least a first regulated amount of current; and produce a fourth current that flows to the current-to-voltage converter when the first regulated amount of current exceeds the second current, the fourth current substantially equal to a difference between the second current and the first regulated amount of current;

the second current regulator is configured to:

produce at least a second regulated amount of current; and produce a fifth current that flows to the current-to-voltage converter when the second regulated amount of current exceeds the third current, the fifth current substantially equal to a difference between the third current and the second regulated amount of current; and the current-to-voltage converter is configured to:

convert the fourth current to a third voltage; and convert the fifth current to a fourth voltage, the fourth voltage and the third voltage being proportional to the difference between the first and second voltages.

2. The optoelectronic transceiver as recited in claim 1, wherein the TO package comprises a 4-pin TO package.

3. The optoelectronic transceiver as recited in claim 1, wherein the differential output of the first stage circuit comprises a pair of amplified differential signals.

4. The optoelectronic transceiver as recited in claim 1, wherein the pair of amplified differential signals are about 180 degrees out of phase with each other.

5. The optoelectronic transceiver as recited in claim 1, wherein the pair of amplified differential signals have substantially the same amplitude.

6. The optoelectronic transceiver as recited in claim 1, wherein:

the voltage-to-current converter comprises a first resistor coupled between two bipolar junction transistors;

the first resistor is configured to conduct the first current;

the current-to-voltage converter comprises a second resistor; and at least one of the fourth and fifth currents flow to the second resistor through a field effect transistor.

7. The optoelectronic transceiver as recited in claim 1, wherein the first current regulator comprises a first field effect transistor configured to selectively provide a first shortfall amount of current that is substantially equal to a difference between the second current and the first regulated amount of current.

8. The optoelectronic transceiver as recited in claim 7, wherein the second current regulator comprises a second field effect transistor configured to selectively provide a second shortfall amount of current that is substantially equal to a difference between the third current and the second regulated amount of current.

* * * * *

UNITED STATES PATENT AND TRADEMARK OFFICE
CERTIFICATE OF CORRECTION

| | | |
|---|---|---|
| PATENT NO. | : 7,470,884 B2 | Page 1 of 1 |
| APPLICATION NO. | : 11/068284 | |
| DATED | : December 30, 2008 | |
| INVENTOR(S) | : Shapiro | |

It is certified that error appears in the above-identified patent and that said Letters Patent is hereby corrected as shown below:

Column 6
Line 15, change "first left" to --first right--
Line 27, change "ground connected" to --ground are connected--

Column 8
Line 43, change "of-this" to --of this--

Signed and Sealed this

Twenty-second Day of February, 2011

David J. Kappos
*Director of the United States Patent and Trademark Office*